US011868197B2

(12) United States Patent
De Rochebouet et al.

(10) Patent No.: US 11,868,197 B2
(45) Date of Patent: *Jan. 9, 2024

(54) LEARNING METHOD FOR THE DETECTION OF ANOMALIES IMPLEMENTED ON A MICROCONTROLLER AND ASSOCIATED METHOD FOR DETECTING ANOMALIES

(71) Applicant: Cartesiam, Toulon (FR)

(72) Inventors: Francois De Rochebouet, Toulon (FR); He Huang, Toulon (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,548

(22) Filed: Apr. 25, 2022

(65) Prior Publication Data

US 2022/0245046 A1  Aug. 4, 2022

Related U.S. Application Data

(63) Continuation of application No. 16/880,133, filed on May 21, 2020, now Pat. No. 11,341,016.

(30) Foreign Application Priority Data

May 21, 2019 (FR) ...................................... 1905293

(51) Int. Cl.
*G06F 11/00* (2006.01)
*G06F 11/07* (2006.01)
*G06F 9/50* (2006.01)
*G06F 11/30* (2006.01)
*G06F 11/32* (2006.01)
*G06F 18/22* (2023.01)

(52) U.S. Cl.
CPC ........ *G06F 11/0751* (2013.01); *G06F 9/5016* (2013.01); *G06F 11/3013* (2013.01); *G06F 11/3072* (2013.01); *G06F 11/3089* (2013.01); *G06F 11/327* (2013.01); *G06F 18/22* (2023.01)

(58) Field of Classification Search
CPC ............. G06F 11/0751; G06F 11/0778; G06F 11/3072; G06F 11/3075; G06F 11/3089; G06F 11/327
See application file for complete search history.

(56) References Cited

U.S. PATENT DOCUMENTS 8,185,781 B2   5/2012   Chen et al.
9,686,283 B2 * 6/2017   Hunt ................... H04L 63/1416
(Continued)

FOREIGN PATENT DOCUMENTS

WO   2007087729 A1   8/2007

OTHER PUBLICATIONS

Search Report as issued in French Patent Application No. 1905293, dated Feb. 26, 2020.

*Primary Examiner* — Charles Ehne
(74) *Attorney, Agent, or Firm* — Slater Matsil, LLP

(57) ABSTRACT

A learning method detects anomalies and is implemented on a microcontroller including at least one memory, the microcontroller being configured to receive data sets coming from at least one sensor, the memory being configured to store a maximum number of categories, a category including at least a signature and an occurrence.

20 Claims, 3 Drawing Sheets

(56) References Cited

U.S. PATENT DOCUMENTS

| | | | |
|---|---|---|---|
| 2007/0265713 A1* | 11/2007 | Veillette | G05B 23/0245 700/30 |
| 2010/0058469 A1 | 3/2010 | Yen et al. | |
| 2010/0262858 A1 | 10/2010 | Chen et al. | |
| 2011/0276836 A1 | 11/2011 | Kahana et al. | |
| 2017/0331293 A1* | 11/2017 | Narla | H02J 3/381 |
| 2018/0181611 A1 | 6/2018 | Harsha et al. | |
| 2018/0299877 A1 | 10/2018 | Cheng et al. | |
| 2019/0227504 A1* | 7/2019 | Ma | G05B 13/042 |

* cited by examiner

LEARNING METHOD FOR THE DETECTION OF ANOMALIES IMPLEMENTED ON A MICROCONTROLLER AND ASSOCIATED METHOD FOR DETECTING ANOMALIES

CROSS-REFERENCE TO RELATED APPLICATIONS

This application is a continuation of U.S. application Ser. No. 16/880,133, filed on May 21, 2020, which claims priority to French Patent Application No. 1905293, filed May 21, 2019, which applications are hereby incorporated by reference herein in their entirety.

TECHNICAL FIELD

The technical field of the invention is that of methods for detecting anomalies and, more particularly, that of methods for detecting anomalies implemented on a microcontroller.

The present invention relates to a learning method for detecting anomalies and in particular, a learning method for detecting anomalies implemented on a microcontroller. The present invention also relates to a method for detecting anomalies.

BACKGROUND

Algorithms for detecting anomalies conventionally use deep learning techniques such as neural networks, making it possible to obtain high detection rates. Such techniques require the use of powerful processors and a considerable amount of memory resources to be functional.

Thus, these techniques are incompatible with implementation on a microcontroller constrained in terms of memory resources but with a high degree of integration thanks to reduced dimensions.

There thus exists a need to design an algorithm for detecting anomalies making it possible to obtain detection rates comparable to those obtained with deep learning techniques, implemented on a microcontroller which can be embedded on any system whatever its environment.

SUMMARY

An aspect of the invention offers a solution to the aforementioned problems, by making it possible to detect anomalies thanks to an algorithm implemented on a microcontroller having a high integration capacity.

A first aspect of the invention relates to a learning method for the detection of anomalies implemented on a microcontroller comprising at least one memory, the microcontroller being configured to receive data sets coming from at least one sensor, the memory being configured to store a maximum number of categories, a category comprising at least a signature and an occurrence, the method comprising the following steps:

As long as a rate of progress is less than a progress threshold, for each data set of a set of data sets:
  Storage of the data set in the memory;
  Calculation of a signature of the data set;
  If there exists at least one category stored in the memory:
  Calculation of a similarity measurement between the signature of the data set and the signature of each category and selection of the maximum similarity measurement:
    If the maximum similarity measurement meets a condition of updating, updating the corresponding category from the data set;
    If not: If the number of categories stored in the memory is lower than a maximum number of categories, creation of a category from the data set in the memory; If not, selection of the category having a minimum occurrence; If the minimum occurrence meets a condition of occurrence, deletion of the corresponding category and creation of a category from the data set in the memory; If not, selection of the two categories of which the signatures have a maximum similarity measurement, creation of a single category by merging the two selected categories and creation of a category from the data set in the memory;
  If no category exists, creation of a category from the data set in the memory;
  Deletion of the data set from the memory and updating the rate of progress.

Thanks to the invention, each data set delivered by the sensor during learning is allocated to a category representative of similar data sets or to a new category, without exceeding the maximum number of categories corresponding to the maximum memory resources that can be allocated to the categories in the memory of the microcontroller.

Apart from the characteristics that have been mentioned in the preceding paragraph, the method according to a first aspect of the invention may have one or more complementary characteristics among the following, considered individually or according to all technically possible combinations thereof.

According to an alternative embodiment, the sub-step of updating a category comprises a step of updating the signature of the category from the signature of the data set and of incrementing the occurrence of the category.

Thus, the category the closest to the data set is updated to take into account the characteristics of the data set.

According to an alternative embodiment compatible with the preceding alternative embodiment, the sub-step of creation of a category comprises a step of allocation of the signature of the data set to the signature of the single category and of allocation of an occurrence of 1 to the category.

Thus, the characteristics of the new category are those of the data set.

According to an alternative embodiment compatible with the preceding alternative embodiments, the sub-step of creation of a single category by merging comprises a step of allocation of the barycentre of the signatures of the two categories to merge with the signature of the single category and of allocation of the sum of the occurrences of the two categories to merge with the occurrence of the single category.

Thus, the characteristics of the single category take into account the characteristics of the two merged categories.

A second aspect of the invention relates to a method for detecting anomalies implemented on a microcontroller comprising at least one memory, the microcontroller being configured to receive data sets coming from at least one sensor, the memory being configured to store a maximum number of categories, a category comprising at least a signature and an occurrence, the method comprising the steps of the learning method according to a first aspect of the invention followed by the following steps:

For each data set received:
  Storage of the data set in the memory;
  Calculation of the signature of the data set;

Selection of the category of maximum occurrence and calculation of the similarity measurement between the signature of the data set and the signature of the selected category:

If the similarity measurement meets a condition of normality, deletion of the data set from the memory;

If not, if categories remain for which no similarity measurement has been calculated with the signature of the data set and if the similarity measurements calculated previously do not meet the condition of normality:

Selection of the category having an occurrence equal to or immediately lower than the occurrence of the category of which the signature has been used to calculate the preceding similarity measurement and calculation of the similarity measurement between the signature of the data set and the signature of the selected category;

If the similarity measurement meets the condition of normality, deletion of the data set from the memory;

If none of the similarity measurements calculated previously meets the condition of normality, detection of an anomaly and deletion of the data set from the memory.

Thus, the method for detecting anomalies according to a second aspect of the invention uses the categories created during the learning method according to a first aspect of the invention to detect anomalies efficiently while stopping the calculations as soon as the studied data set may be considered as non-anomalous, which limits the amount of memory resources used for the calculations in the memory of the microcontroller.

According to an alternative embodiment, the step for detecting an anomaly comprises a sub-step of triggering an alarm.

According to an alternative embodiment compatible with the preceding alternative embodiment, the step for detecting an anomaly comprises a sub-step of sending an alert message.

According to an alternative embodiment compatible with the preceding alternative embodiments, the method according to a second aspect of the invention once again comprises the steps of the learning method according to a first aspect of the invention.

Thus, if the environment of the device on which the detection of anomalies is carried out has changed, it is possible to carry out a new learning phase.

A third aspect of the invention relates to a microcontroller implementing the steps of the learning method according to a first aspect of the invention and/or the steps of the method for detecting anomalies according to a second aspect of the invention, comprising a processor and a memory and receiving data sets coming from at least one sensor.

According to an embodiment, the sensor is connected to the microcontroller via a serial data bus.

According to another embodiment, the sensor is connected to the microcontroller via a wired or wireless connection.

A fourth aspect of the invention relates to a computer programme product comprising instructions which, when the programme is executed by a computer, lead the computer to implement the steps of the learning method according to a first aspect of the invention and/or the steps of the method for detecting anomalies according to a second aspect of the invention.

In another embodiment, there is provided a non-transitory computer readable medium that includes a computer programme product comprising instructions which, when the programme is executed by a computer, lead the computer to implement the steps of the learning method according to a first aspect of the invention and/or the steps of the method for detecting anomalies according to a second aspect of the invention.

The invention and the different applications thereof will be better understood on reading the description that follows and by examining the figures that accompany it.

BRIEF DESCRIPTION OF THE DRAWINGS

The figures are presented for indicative purposes and in no way limit the invention.

DETAILED DESCRIPTION OF ILLUSTRATIVE EMBODIMENTS

Unless stated otherwise, a same element appearing in different figures has a single reference.

A first aspect of the invention relates to a learning method for the detection of anomalies implemented on a microcontroller receiving data sets coming from at least one sensor.

A second aspect of the invention relates to a method for detecting anomalies comprising the learning method according to a first aspect of the invention implemented on a microcontroller receiving data sets coming from at least one sensor.

A same microcontroller may be used to implement the learning method according to a first aspect of the invention and the detection method according to a second aspect of the invention.

"Detection of anomalies" is taken to mean the identification of particular data which differ in a significant manner from the majority of other data.

The detection of anomalies is for example used for the supervision of industrial machines within the context of preventive maintenance, for the detection of energy over-consumption in a household or instead to detect an intruder in a room.

Figure 3:
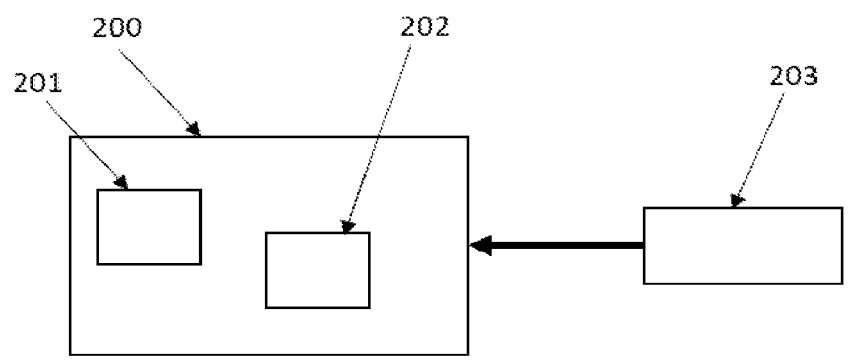
FIG. 3 shows a schematic representation of a microcontroller according to a third aspect of the invention.

FIG. 3 shows a schematic representation of a microcontroller 200 according to a second aspect of the invention.

A microcontroller 200 is an integrated circuit comprising a microprocessor 202 and at least one memory 201 (e.g. in the form of hardware). In FIG. 3, the microcontroller 200 comprises a single memory 201.

The microprocessor 202 has for example a frequency greater than 2 MHz. The microprocessor 202 is for example a 50 MHz microprocessor.

The memory 201 has storage capacities enabling it to store a finite number of categories and a single data set. The number of categories that the memory 201 can store thus depends on the storage capacities of the memory 201 but also on the size of the studied data set.

A category comprises a signature, at least a signature of a data set and an occurrence. The occurrence corresponds to the number of data set signatures stored in the category.

"Signature" is taken to mean a representative element. The signature of a category is thus an element representative of this category.

A signature is a discrete statistical distribution. Thus, the signature of a data set is a discrete statistical distribution applied to the data of the data set and the signature of a category is a discrete statistical distribution applied to the signatures of the data sets stored in the category.

The discrete statistical distribution for a data set may be different from the discrete statistical distribution for a category.

The signature of a category is for example the average, the median, the variance, the maximum, the minimum or instead the correlation rate of the signatures of the data sets stored in the category.

The memory 201 has for example a random access memory of at least 2 kilooctets. The memory 201 has for example a random access memory of 32 kilooctets and may then store 32 categories at the most, the number of categories being able to be stored depending on the size of the studied data set.

The microcontroller 200 receives data coming from at least one sensor 203. In FIG. 3, the microcontroller 200 receives data sets coming from a single sensor 203.

According to a first embodiment, the sensor 203 is connected to the microcontroller 200 via a serial data bus, for example a I2C, SPI, CAN or UART serial data bus.

According to a second embodiment, the microcontroller 200 receives for example the data sets from the sensor 203 via a wired connection, for example an Ethernet link, or a wireless connection, for example a Bluetooth or Wi-Fi connection.

The sensor 203 is for example an accelerometer having a given sampling frequency. A data set then comprises for example 1024 frequency values at a sampling frequency of 800 Hz.

The sensor 203 is for example a thermometer delivering temperature data sets.

The sensor 203 is for example a barometer delivering pressure data sets.

The sensor 203 is for example a thermal camera. A data set is for example an 8.times.8 array of pixels.

The microcontroller 200 may be connected to several sensors 203. The data sets are then composed, a data set comprises for example pressure data and temperature data.

Figure 1:
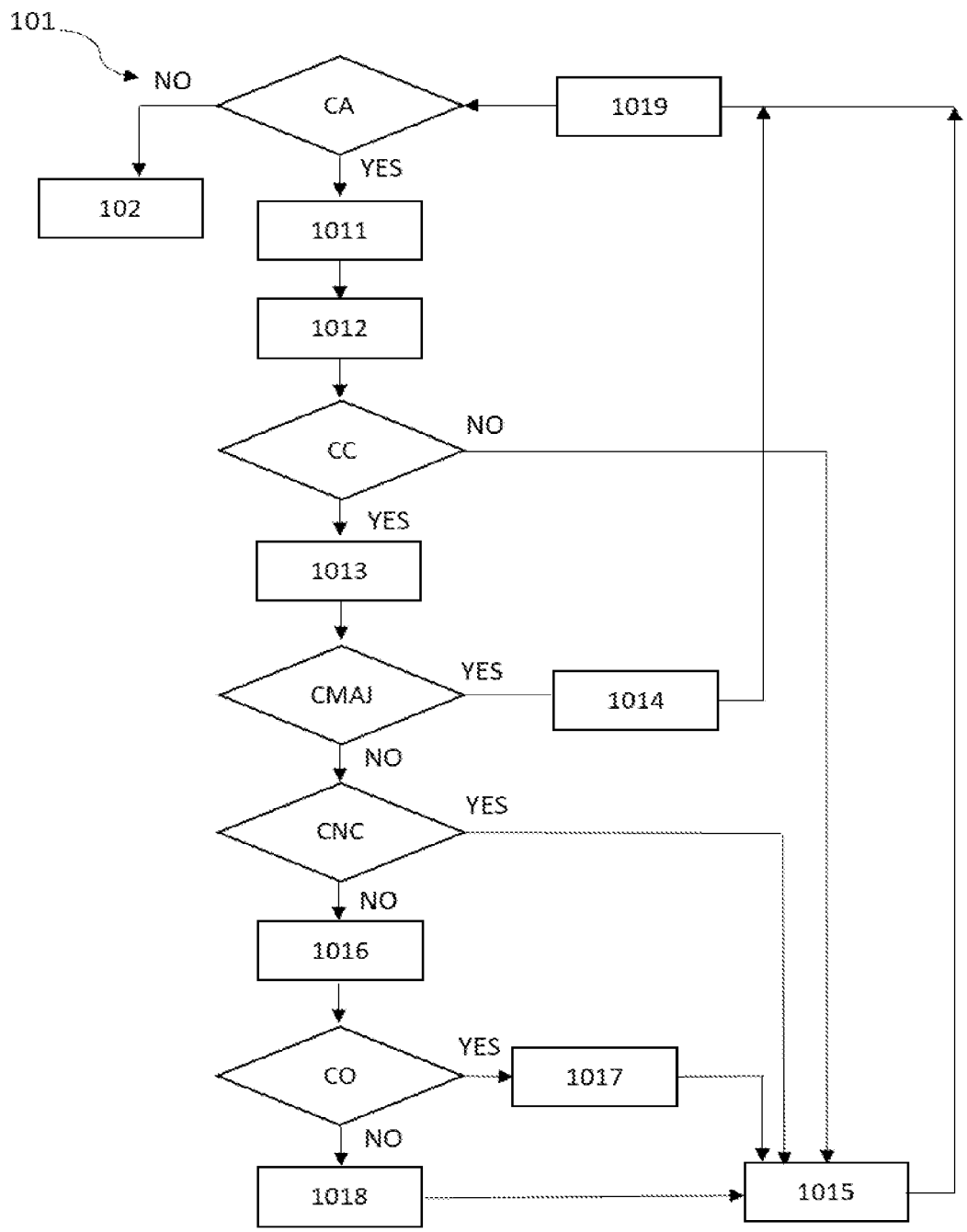
FIG. 1 shows a synoptic diagram of a learning method according to a first aspect of the invention.

FIG. 1 is a synoptic diagram illustrating the sequence of steps 1011 to 1019 of the learning method 101 according to a first aspect of the invention.

The learning method 101 according to a first aspect of the invention is an unsupervised learning method carried out on a set of data sets supplied by the sensor 203.

"Unsupervised learning" is taken to mean automatic learning carried out with non-labelled data, that is to say raw data such as provided by the sensor 203.

The steps 1011 to 1019 of the method 101 are carried out for each data set of the set of data sets.

The first step 1011 consists in storing the data set in the memory 201 of the microcontroller 200.

The second step 1012 consists in calculating a signature for the data set stored in the memory 201 of the microcontroller 200.

The signature of a data set is calculated differently according to the type of data supplied by the sensor 203.

In the case where the data set is frequential, the signature of the data set is for example the discrete Fourier transform of the data set.

In the case where the data set is an array of pixels, the signature of the data set is for example the average or the median of the grey levels on these pixels.

A condition of category CC is that there exists at least one category stored in the memory 201 of the microcontroller 200.

If the condition of category CC is verified, the third step 1013 is carried out.

The third step 1013 consists in calculating a similarity measurement between the signature of the data set and the signature of each category stored in the memory 201 of the microcontroller 200.

The similarity measurement is for example calculated from position characteristics, such as for example the median and/or the average, and/or from dispersion characteristics, such as for example the variance and/or standard deviation of the discrete statistical distribution chosen as signature of the studied data set.

In the case where the signature of a category is the average of the signatures of the data sets stored in the category, the similarity measurement is for example a calculation of the distance between the signature of the category and the average of the discrete statistical distribution used as signature of the studied data set. The distance used is for example a Euclidean distance.

Thus, in the case where the data set is frequential, the similarity measurement is for example the Euclidean distance between the average of the frequencies obtained thanks to the discrete Fourier transform applied to the studied data set and the average of the frequencies obtained thanks to the discrete Fourier transform of each data set stored in the category.

Once a similarity measurement has been calculated for each category stored in the memory 201 of the microcontroller 200, the third step 1013 consists in selecting the maximum similarity measurement.

If several categories have the same maximum similarity measurement, the category of maximum occurrence is selected. If several of these categories have a same maximum occurrence, the selection is random.

If a condition of updating CMAJ is verified, the fourth step 1014 is carried out.

The condition of updating CMAJ is for example based on the average of the similarity measurements calculated between the studied data set and each category or average similarity measurement. For example, the condition of updating CMAJ is that the maximum similarity measurement is greater than 1.5 times the average similarity measurement.

The fourth step 1014 consists in updating the category corresponding to the maximum similarity measurement from the data set.

For example, the signature of the corresponding category is updated from the signature of the data set, the signature of the data set is stored in the corresponding category and the occurrence of the corresponding category is incremented by 1.

For example, in the case where the signature of the category is the average of the signatures of the data sets stored in the category, updating the category consists in re-calculating the average of the signatures of the data sets stored in the category after addition in the category of the signature of the studied data set.

A condition of number of categories CNC is that the number of categories stored in the memory 201 of the microcontroller 200 is less than the maximum number of categories that the memory 201 can store.

If the condition of updating CMAJ is not verified and if the condition of number of categories CNC is verified, the fifth step 1015 is carried out.

The fifth step 1015 consists in creating a new category from the data set and storing the new category in the memory 201 of the microcontroller 200.

For example, the signature of the new category is the signature of the data set and the occurrence is 1.

If the condition of updating CMAJ and the condition of number of categories CNC are not verified, the sixth step 1016 is carried out.

The sixth step 1016 consists in selecting, among the categories stored in the memory 201 of the microcontroller 200, the category having the minimum occurrence.

If several categories have a same minimum occurrence, one of the categories is selected randomly.

If a condition of occurrence CO is verified, the seventh step 1017 is carried out.

The condition of occurrence CO depends for example on the ratio between the minimum occurrence and the sum of the occurrences of all the categories. For example, the condition of occurrence CO is that the minimum occurrence is less than 5% of the sum of the occurrences of all the categories.

The seventh step 1017 consists in deleting from the memory 201 of the microcontroller 200 the category corresponding to the minimum occurrence.

Once the corresponding category has been deleted, the fifth step 1015 of creation of a new category from the data set is carried out.

If the condition of occurrence CO is not verified, the eighth step 1018 is carried out.

The eighth step 1018 consists in merging two categories stored in the memory 201 of the microcontroller 200 to create a single category.

The two merged categories are those having the maximum similarity measurement between their signatures.

The merging creates for example a single category having for signature the barycentre of the signatures of the two merged categories, having for occurrence the sum of the occurrences of the two categories and storing the signatures of data sets of the two categories.

Once the two categories have been merged into a single category, the fifth step 1015 of creation of a new category from the data set is carried out.

If the condition of category CC is not verified following the second sub-step 1012, the fifth step 1015 of creation of a new category from the data set is carried out.

Once a new category has been created from the data set or when a category stored in the memory 201 of the microcontroller 200 has been updated from the data set, the ninth step 1019 is carried out.

The ninth step 1019 consists in deleting the data set from the memory 201 of the microcontroller 200 and updating a rate of progress.

The rate of progress is for example incremented when no category has been created for the data set and decremented in the opposite case.

The steps 1011 to 1019 of the learning method 101 are carried out as long as the rate of progress is less than a predefined progress threshold CA. The set of data sets then corresponds to the set of data sets supplied by the sensor 203 as long as the rate of progress is less than the progress threshold.

The progress threshold is for example 80%.

Figure 2:
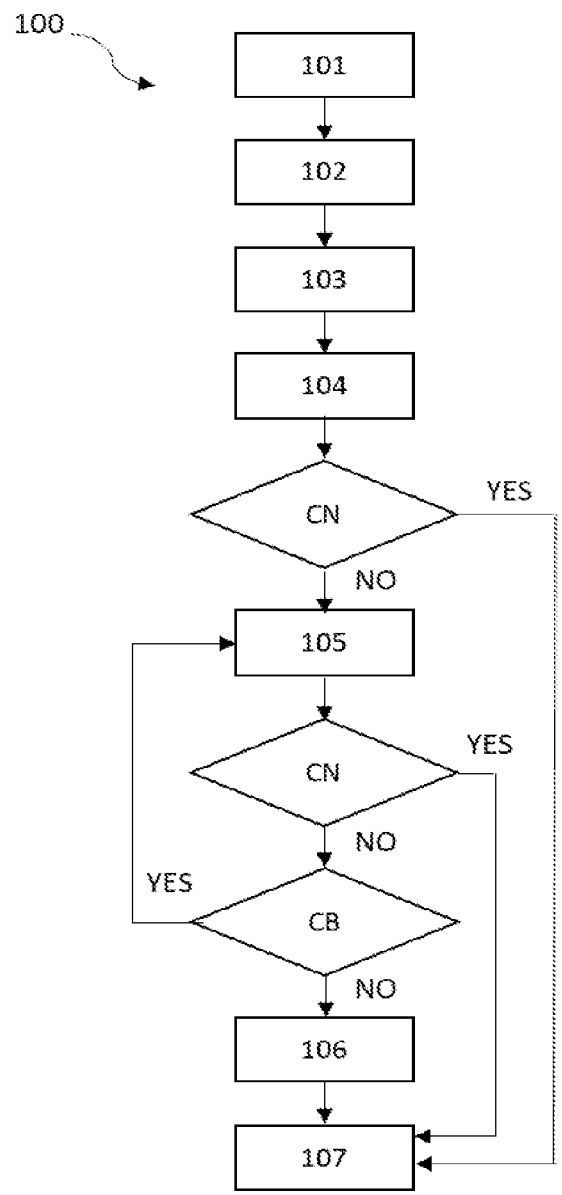
FIG. 2 shows a synoptic diagram of a method for detecting anomalies according to a second aspect of the invention.

FIG. 2 is a synoptic diagram illustrating the sequence of steps 101 to 107 of the method 100 for detecting anomalies according to a second aspect of the invention.

Once the learning method 101 has been carried out, steps 102 to 107 of the method 100 for detecting anomalies according to a second aspect of the invention are carried out for each data set supplied by the sensor 203.

The second step 102 consists in storing the data set in the memory 201 of the microcontroller 200.

The third step 103 consists in calculating the signature of the data set.

The fourth step 104 consists in selecting the category of maximum occurrence and calculating the similarity measurement between the signature of the data set and the signature of the category of maximum occurrence.

If several categories have a same maximum occurrence, the selection is random among these categories.

If a condition of normality CN is verified for the similarity measurement of the category of maximum occurrence, the seventh step 107 is carried out.

The condition of normality CN is for example that the similarity measurement of the category of maximum occurrence is greater than or equal to the average similarity measurement between the signatures of the data sets stored in the category.

The seventh step 107 consists in deleting the data set from the memory 201 of the microcontroller 200.

If the condition of normality CN is not verified for the similarity measurement of the category of maximum occurrence and as long as there remains categories for which no similarity measurement has been calculated with the signature of the data set and that none of the similarity measurements calculated previously meets the condition of normality CN CB, the fifth step 105 is carried out.

The fifth step 105 consists in selecting the category having the occurrence equal to or immediately lower than the occurrence of the category of which the signature has been used to calculate the final similarity measurement and to calculate the similarity measurement between the signature of the data set and the signature of the selected category.

If the condition of normality CN is verified for the similarity measurement calculated at the fifth step 105, the seventh step 107 of deleting the data set from the memory 201 is carried out.

If the condition of normality CN is not verified for the similarity measurement calculated at the fifth step 105 and that categories remain for which no similarity measurement has been calculated with the signature of the data set, the fifth step 105 is carried out once again.

If the condition of normality CN is verified for none of the similarity measurements calculated previously and if a similarity measurement has been calculated for each category of the memory 201, the sixth step 106 is carried out.

The sixth step 106 consists in detecting an anomaly.

The sixth step 106 may for example consist in the triggering of an alarm or in the sending of an alert message to a given item of equipment.

Once the anomaly has been detected, the seventh step 107 of deleting the data set from the memory 201 is carried out.

The detection of an anomaly may lead to a resumption of learning, that is to say that the detection of anomalies may be followed by the learning method 101. The decision to resume learning is a decision taken externally to the method 100.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

What is claimed is:

1. A method for detecting anomalies implemented on a microcontroller having a memory, the method comprising:
   receiving, by the microcontroller, data sets from a sensor; and
   in response to determining that a rate of progress is less than a threshold, for each data set of a set of the data sets:
      storing the data set in a memory of the microcontroller,
      calculating a signature of the data set, and
      in response to determining that a category is stored in the memory:
         calculating a similarity measurement between the signature of the data set and the signature of each category, each category comprising a signature and an occurrence,
         selecting a maximum similarity measurement from calculated similarity measurements, and
         updating a corresponding category from the data set in response to the maximum similarity measurement meeting a condition of updating.

2. The method of claim 1, wherein in response to the maximum similarity measurement failing to meet a condition of updating, the method further comprises:
   creating a new category from the data set in the memory in response to a number of categories in the memory being less than a maximum number of categories;
   selecting a category having a minimum occurrence in response to the number of categories in the memory being equal or greater than the maximum number of categories; and
   deleting the corresponding category and creating the new category from the data set in the memory in response to the minimum occurrence meeting a condition of occurrence.

3. The method of claim 2, wherein in response to the minimum occurrence failing to meet a condition of occurrence, the method further comprises:
   selecting two categories having signatures with the maximum similarity measurement; and
   creating the new category by merging the two selected categories.

4. The method of claim 3, wherein creating the new category by merging the two selected categories comprises:
   allocating barycentre of the signatures of the two categories to merge with a signature of the new category; and allocating a sum of occurrences of the two categories to merge with an occurrence of the new category.

5. The method of claim 3, wherein the method further comprises:
creating the new category from the data set in the memory in response to determining that the category is not stored in the memory; and
deleting the data set from the memory and updating the rate of progress.

6. The method of claim 5, wherein creating the new category comprises:
allocating a signature of the data set to a signature of a single category; and
allocating an occurrence of one to the category.

7. The method of claim 1, wherein updating the corresponding category comprises:
updating a signature of the category from a signature of the data set; and
incrementing the occurrence of the category.

8. A method for detecting anomalies implemented on a microcontroller having a memory, the method comprising:
receiving, by the microcontroller, data sets from a sensor, wherein for each data set received, the method further comprises:
storing the data set in a memory of the microcontroller,
calculating a signature of the data set,
selecting a category of maximum occurrence, each category comprising a signature and an occurrence,
calculating a similarity measurement between the signature of the data and a signature of the category of maximum occurrence, and
deleting the data set from the memory in response to similarity measurement meeting a condition of normality, and
in response to the similarity measurement failing to meet the condition of normality and in response to having categories remaining in memory without a calculated similarity measurement with the signature of the data set:
selecting a category having an occurrence equal to or immediately less than the occurrence of the category of which the signature has been used to calculate a preceding similarity measurement,
calculating the similarity measurement between the signature of the data set and the signature of the selected category, and
deleting the data set from the memory in response to the similarity measurement calculated meeting the condition of normality.

9. The method of claim 8, further comprising:
detecting an anomaly in response to the similarity measurement calculated failing to meet the condition of normality; and
deleting the data set from the memory.

10. The method of claim 9, wherein the detecting the anomaly comprises triggering an alarm.

11. The method of claim 10, wherein the detecting the anomaly comprises sending an alert message.

12. The method of claim 8, further comprising repeating the step of receiving the data sets from the sensor.

13. The method of claim 8, wherein a serial data bus couples the sensor to the microcontroller.

14. The method of claim 8, wherein the sensor is coupled to the microcontroller using a wired or wireless connection.

15. A device, comprising:
a sensor;
a memory comprising instructions; and
a processor coupled to the memory and the sensor, wherein the instructions, when executed by the processor, cause the processor to:
receive data sets from a sensor; and
in response to determining that a rate of progress is less than a threshold, for each data set of a set of the data sets:
store the data set in the memory,
calculate a signature of the data set, and
in response to determining that a category is stored in the memory:
calculate a similarity measurement between the signature of the data set and the signature of each category, each category comprising a signature and an occurrence,
select a maximum similarity measurement from calculated similarity measurements, and
update a corresponding category from the data set in response to the maximum similarity measurement meeting a condition of updating.

16. The device of claim 15, wherein the instructions, when executed by the processor, cause the processor to:
create a new category from the data set in the memory in response to a number of categories in the memory being less than a maximum number of categories;
select a category having a minimum occurrence in response to the number of categories in the memory being equal or greater than the maximum number of categories; and
delete the corresponding category and creating the new category from the data set in the memory in response to the minimum occurrence meeting a condition of occurrence.

17. The device of claim 16, wherein the instructions, when executed by the processor, cause the processor, in response to the minimum occurrence failing to meet a condition of occurrence, to:
select two categories having signatures with the maximum similarity measurement; and
create the new category by merging the two selected categories.

18. The device of claim 17, wherein the instructions, wherein creating the new category by merging the two selected categories comprises:
allocating barycentre of the signatures of the two categories to merge with a signature of the new category; and
allocating a sum of occurrences of the two categories to merge with an occurrence of the new category.

19. The device of claim 18, wherein the instructions, when executed by the processor, cause the processor to:
create the new category from the data set in the memory in response to determining that the category is not stored in the memory; and
delete the data set from the memory and updating the rate of progress.

20. The device of claim 18, wherein creating the new category comprises:
allocating a signature of the data set to a signature of a single category; and
allocating an occurrence of one to the category.

* * * * *